(12) United States Patent
Karbowski

(10) Patent No.: US 6,718,350 B1
(45) Date of Patent: Apr. 6, 2004

(54) METHOD AND SYSTEM FOR SELECTIVELY UPDATING RATING DATA AND SOFTWARE DATA VIA INTERNET OR INTRANET IN A CARRIER MANAGEMENT SYSTEM

(75) Inventor: Kenneth Karbowski, Farmington, CT (US)

(73) Assignee: Pitney Bowes Inc., Stamford, CT (US)

( * ) Notice: Subject to any disclaimer, the term of this patent is extended or adjusted under 35 U.S.C. 154(b) by 498 days.

(21) Appl. No.: 09/717,873

(22) Filed: Nov. 21, 2000

(51) Int. Cl.[7] .............................................. G06F 17/30
(52) U.S. Cl. ...................................................... 707/203
(58) Field of Search ................................. 707/200, 203

(56) References Cited

U.S. PATENT DOCUMENTS

| | | | | |
|---|---|---|---|---|
| 4,718,506 A | | 1/1988 | Hills ............................ 177/25 |
| 5,357,631 A | * | 10/1994 | Howell et al. ............... 717/203 |
| 5,457,792 A | | 10/1995 | Virgil et al. ................. 395/600 |
| 5,535,392 A | | 7/1996 | Brett ........................... 395/700 |
| 5,778,348 A | | 7/1998 | Manduley et al. ........... 705/409 |
| 5,819,295 A | * | 10/1998 | Nakagawa et al. .......... 707/203 |
| 5,890,169 A | | 3/1999 | Wong et al. ................. 707/206 |
| 5,909,689 A | | 6/1999 | Ryzin .......................... 707/203 |
| 5,970,501 A | * | 10/1999 | Hunkins et al. ............. 707/200 |
| 6,049,799 A | * | 4/2000 | Mangat et al. .............. 707/10 |
| 6,101,487 A | | 8/2000 | Yeung .......................... 705/410 |
| 6,259,445 B1 | | 7/2001 | Hennum et al. ............. 345/338 |
| 6,317,871 B1 | | 11/2001 | Andrews et al. .............. 717/5 |
| 6,336,115 B1 | | 1/2002 | Tominaga et al. ............ 707/10 |
| 6,343,300 B1 | | 1/2002 | Suetake ...................... 707/203 |
| 6,345,281 B1 | * | 2/2002 | Kardos et al. .............. 707/201 |
| 6,385,623 B1 | * | 5/2002 | Smith et al. ................. 707/200 |
| 6,557,012 B1 | * | 4/2003 | Arun et al. .................. 707/203 |

* cited by examiner

*Primary Examiner*—Greta Robinson
(74) *Attorney, Agent, or Firm*—Ronald Reichman; Kimberly Chotkowski; Angelo N. Chaclas

(57) ABSTRACT

A method and system for selectively updating information in a carrier management system including maintaining a first and second set of data files stored at first and second data processing centers, respectively. The file transfer may be initiated by either the server or the product. The system parses the first set of files into segments and may further parse the segments into fragments. The segments and/or fragments are then compared to a similarly parsed second set of files to determine which file segments and/or fragments are different. The required files are then transferred from the first data processing center to the second data processing center.

7 Claims, 5 Drawing Sheets

METHOD AND SYSTEM FOR SELECTIVELY UPDATING RATING DATA AND SOFTWARE DATA VIA INTERNET OR INTRANET IN A CARRIER MANAGEMENT SYSTEM

FIELD OF THE INVENTION

The present invention relates generally to the field of information transfer between devices, specifically automatic information transfer within a data processing system. More particularly, the present invention relates to the selective transfer of information between a data processing center and a data processing device, such as a mailing or shipping system.

BACKGROUND OF THE INVENTION

The need for mailing/shipping systems to transfer information from a main system to a customer system in efficient time spans and at less cost has increased in recent years. The growth in the number of overnight carriers and the consistency of two and three day delivery carriers have created vast fleets of transport vehicles representing many transportation modes. Those individuals and businesses using these carrier systems rely on the accuracy of the information contained within their systems to ensure timely delivery of mail items.

Carriers are companies that provide services to their clients for facilitating the transport of letters, parcels, bulk goods, or anything that can be shipped by public, Common, or specialized transport means. There is a great variety in the types and scope of services that can be provided by the individual carrier.

Mailing and shipping systems often rely on, or require, the ability to operate under changing environments and/or changing or updated information. When systems require changing environments and/or changing or updated information, it is also important that the system is provided the most accurate information and in an effective and efficient manner. Therefore, timely transfer and activation of the information are necessary in order to ensure the accuracy of systems relying on that information.

The growth of shipping demand has fueled the drive for carriers to develop new system efficiencies. Technological advances and better methods of doing business, in turn, have spurred greater demand for carrier services. The net result is that the volume of parcels being shipped has continued to spiral upward and so have the number of customers relying on these carrier systems.

An example of one such system requiring updated information is a weighing system, such as a carrier/shipping scale having the capability of calculating charges based on the sensed weight or size of a parcel or mail piece and the corresponding country's carrier rating information. Such systems are developed and manufactured by Pitney Bowes Inc. of Stamford, Conn. These weighing systems require specific postal rate information, without which a mail piece may be returned for insufficient postage, or a carrier manifest rejected as inaccurate, resulting in delayed delivery and/or increased cost. Postal rates and carrier rates are set by each country's postal regulation systems (such as the United States Postal Service or the Royal Post Office for the United Kingdom) or also by carrier regulations. Therefore, a rate change occurs when any individual carrier (for example, U.S Postal Service®, United Parcel Service®, and Federal Express®, etc.) changes its rates. As a result, the scale charts, PROM's, CD's, and disks are updated with the new rates.

The rates may be provided to customers on floppy disk, as scale charts, programmable read-only memory (PROM's), and compact disks (CD's). Pitney Bowes Inc. offers updates to the rates by providing customer's access to new PROM's, CD's, floppy disks, and scale charts, such that the veracity of the systems relying on this information is maintained. Therefore, it is necessary to inform customers that rate updates exist in an efficient and timely manner. The impact of these rate changes is that every system relying on the data must be changed contemporaneously with the actual dictated rate change, or the system will send invalid information, such as incorrect postage amounts or incorrect zip to zone conversions.

To efficiently update these systems, certain information transfer methods have been devised and implemented. One such method is disclosed in U.S. Pat. No. 4,718,506 issued on Jan. 12, 1988 and assigned to Pitney Bowes Inc., entitled "PROM Card Arrangement for Postal/Shipping Scale" and describes storing look-up tables in a programmable read-only memory device (PROM) to provide an information-receiving device with the latest and most accurate information. In order to transfer information, the information provider must create a new PROM containing that information and ship the PROM to the user. The user must then physically remove the old PROM and install the new PROM into the device. Other prior art systems employ a flash PROM or a floppy disk to store and transport updated information. Still, other systems, such as that described in U.S. Pat. No. 5,778,348 issued on Jul. 7, 1998 and assigned to Pitney Bowes Inc., disclose storing a number of active postal rate tables in a memory, disabling access to certain tables and enabling access other tables. Another such method has been disclosed in U.S. patent application Ser. No. 08/942,264 filed on Sep. 30, 1997, which uses object-oriented design programming languages to provide a mechanism for downloading rate data specific to a carrier manager access data system. These systems may also require other software system changes, such as delivery data, zip-zone data, i.e., any information which changes and which is utilized by the system.

Recently, the rates have also been made available through network downloads. Many rate files and software files are large and cumbersome; therefore, when downloaded, they require significant amounts of time and space. In many cases, attempts to download these files fail, requiring several attempts at downloading before the system is updated. Also, in many circumstances, failed downloads require the assistance of a service technician. Because there are so many systems requiring updates within a short period, service technicians may be delayed in solving all the download problems. Again, these delays cause the systems to be unreliable and a costly burden.

The prior art systems discussed, however, do not provide for specializing transfer of information from a data center to a shipping or mailing system. A significant inconvenience and inaccuracy related to unreliable information may also arise from the inability to keep track of which users have received updated information and which users still require updated information. The time delay caused by inefficient file transfers prevents maintenance of the veracity of the system and potentially causes both users and service providers lost profit, lost business, and/or an increasing business expense.

SUMMARY OF THE INVENTION

According to the present invention, automatic request, transfer and verification of information at a reduced cost are achieved by providing a data processing system having a data center and a data processing device. Information transfer occurs if the data center determines that the data processing device requires such a transfer. The information determined to be transferred is based upon a determination that the data files stored within the mailing/shipping system is not the most current information such that an update is required. Upon completion of the transfer, the information is verified and activated for use. The file transfer is initiated by either the server or the product. The server system polls the shipping/mailing system to check its inventory to determine if an update is necessary, or the server may be instructed to automatically initiate a transfer when a new file has been created. The system parses the files into segments files and compares similarly parsed existing files to determine which component files have changed, and thus, require updating. The server then communicates the files, which include the required changes, to the mailing or shipping system. For example, if a postal server/or carrier publishes a rate change version, and the product requests a version, the server would poll the inventory and recognize there is a more recent update than requested. The most recent file would then be sent to the product.

In this scenario, however, the server not only parses the existing file into component files but also breaks the segmented files into a set of fragments. The existing file fragments are compared against similarly fragmented new files to determine the required changes. These smaller changes are packaged by the server into a file for download and transmission to the shipping/mailing system. Components of the product, i.e., shipping/mailing system, reassemble the new fragments into the existing file and complete the update. Once the initial transfer is complete, the system resumes normal operation.

There are three ways to view how product sections can be detected for files updates. First, during data generation, the newer reversion of data file contains modified segments, generates a table of these differences, and maintains this table on the server. When the new version is sent to the product, the known newer segments only are delivered to the product. In another scenario, during the data generation process, a header is attached to the data file. The header contains a directory of data segments along with their version number; and when the server queries the product, the server requests the header tables and, therefore, determines the version of all data segments. Server processing can then determine which new segments are needed and deliver them to the product. In a third scenario, the file version is stored in the data segments. The data design is modified to be expanded to include space to contain this data. When the server queries the product files, it gathers the version information and then updates the product files. The data delivery itself may be streamlined using several file delivery techniques, such as zipping the files, or using different engines.

Upon completion of the information transfer, the device application software compares the effective date of the transferred information with the current date as indicated by the real time clock. If the comparison reveals that the dates either match or that the dates are in the past, the information is activated, and the data processing device is directed to operate under the activated information. If, however, the date is a future date, then the device application software will not activate the new information until the dates match the real time clock. A record of the devices that were contacted and/or the transfer data is maintained at the data center. Record keeping for both billing purposes and information accuracy is enhanced.

DETAILED DESCRIPTION OF THE PREFERRED EMBODIMENTS

Figure 1:
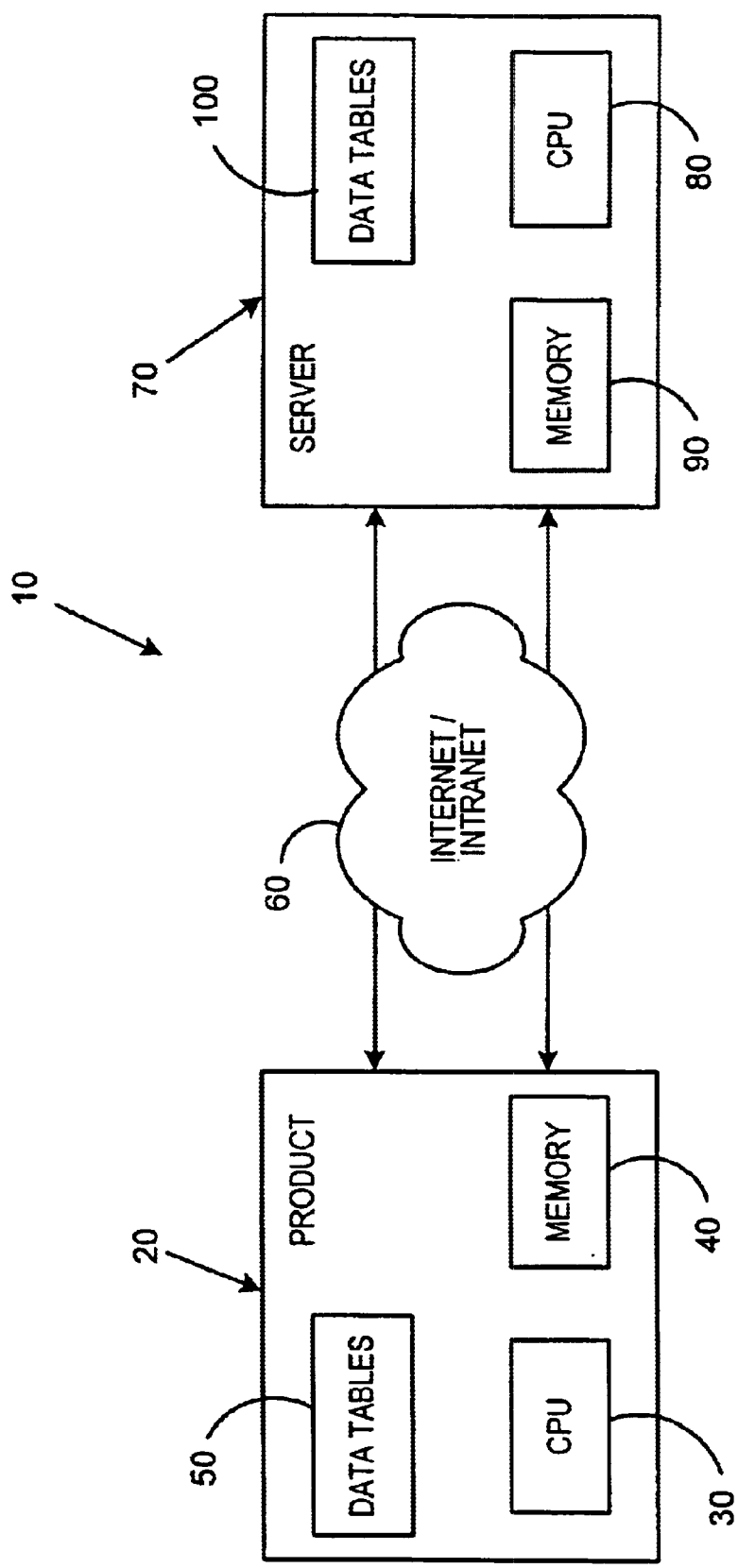
FIG. 1 is a block diagram of the data processing system of the present invention.

Now turning to FIG. 1, there is shown a block diagram of the basic data processing system 10 of the present invention. Data processing system 10 includes a first product system 20 and a server 70 which communicates via Internet or Internet 60. First product system 20 may be any system requiring and relying on accurate information to be stored in data tables 50. An example of a first product system 20 may be a mailing or shipping system, such as a Paragon™ postage meter or Assent™, a package tracking system, developed and manufactured by Pitney Bowes Inc. of Stamford, Conn. First product system 20 herein referred to as Product 20 includes central processing unit for manipulating data communicated via Intranet/Internet 60, memory for storing the transferred information and data tables 50 for maintaining the most accurate and up-to-date information.

Server 70 may be a server system, a personal computer, or any system enabling storage of data, server 70 is referred to herein as server. Server 70 includes central processing unit 80 for manipulating data communicated via Internet/Intranet 60, memory 90 for storing information, and data tables 100 for maintaining accurate and reliable information for transfer to product 20.

Figure 2:
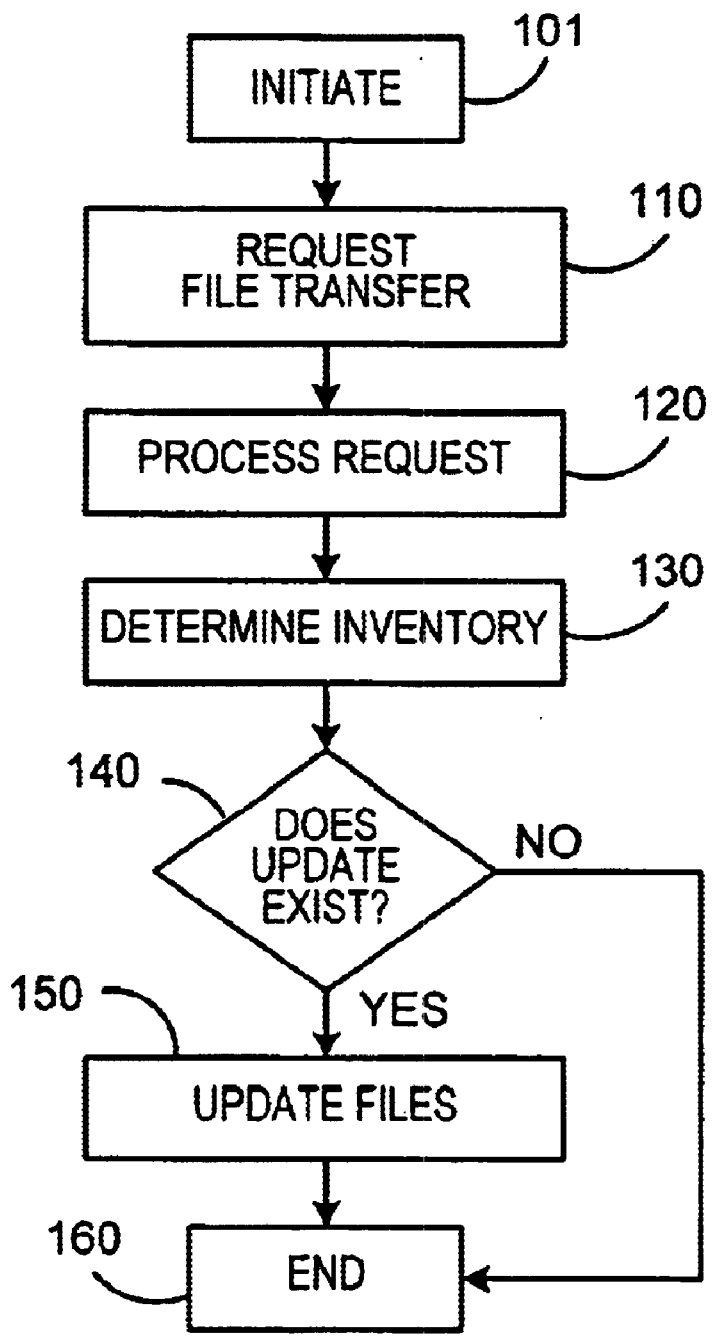
FIG. 2 is a flow chart of one embodiment of the data processing system of the present invention.

Now turning to FIG. 2, there is shown a method flow chart of the data transfer process of the present invention. The system is initiated at step 101, initiation may be prompted by either server 70 or product 20 in several ways such as based upon a predetermined time or by polling the systems or even by direct request when a know change has been made to the file. In his example data transfer is described as being prompted by product 20. Therefore, at step 110 of this embodiment of the present invention, product 20 requests a file transfer from CPU 30 (FIG. 1). Moving to step 120, server 70 begins to process product 20's request. At step 130, server 70 queries product data files to determine inventory. To determine the file that presently exists at product 20, all files may be inventoried such as rate data, delivery data, zip-zone data, or any other file-based information.

The method then proceeds to step 140 where the server 70 is queried as to whether or not an update to product data table 50 exists at server 70. If the answer to the query at step 140 is "yes", then the method proceeds to step 150 where the shipping/mailing system files are updated. If, however, the answer to the query is "no", then the system ends at step 160.

Figure 3:
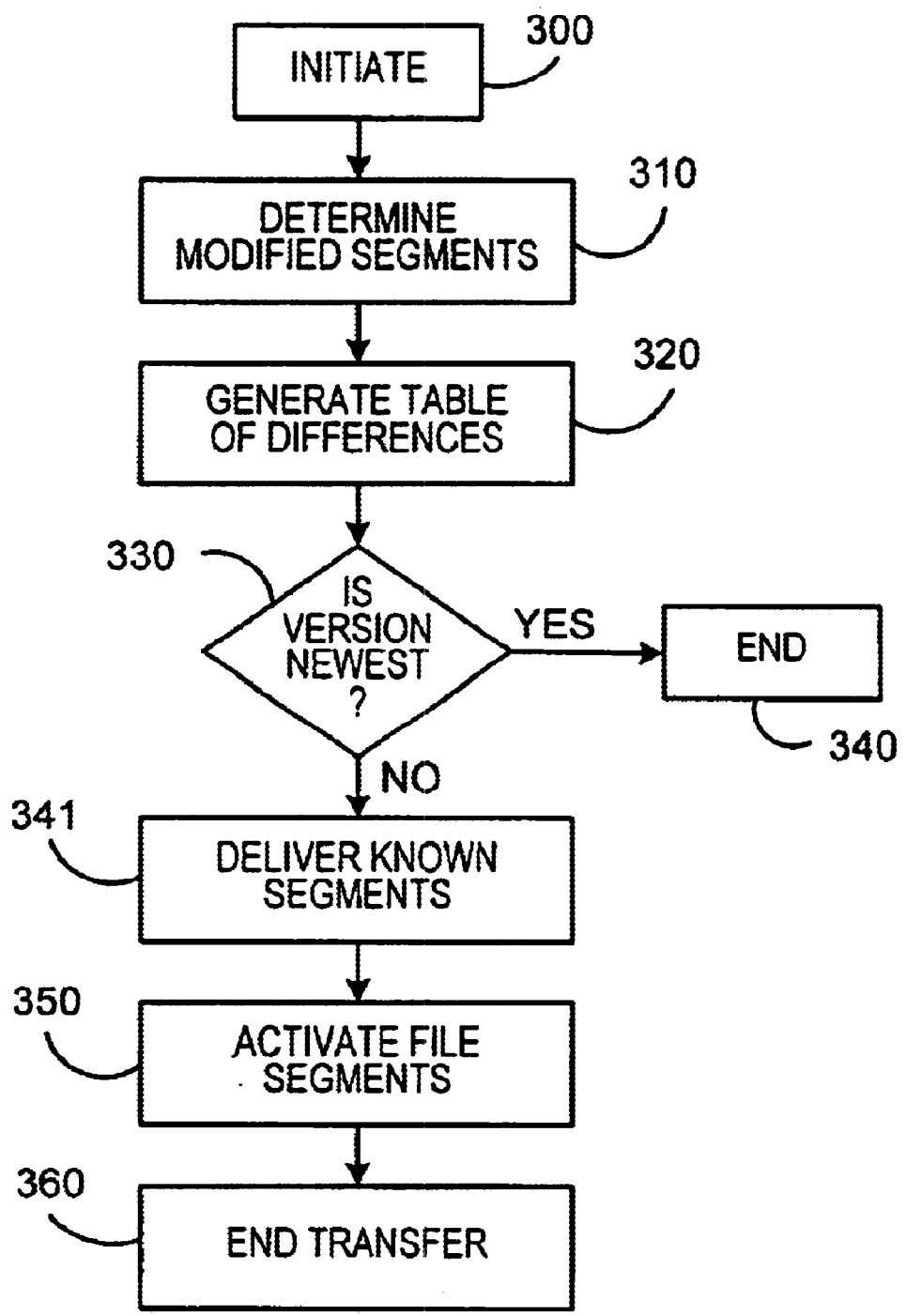
FIG. 3 is a flow chart of another embodiment of the preferred embodiment of the present invention.

Now turning to FIG. 3, there is shown the method flow of another embodiment of the present invention detailing the transfer of information using fragment tables. The method begins at step 300 where the system is initiated either by product 20 or server 70.

At step 310, during data generation determine that a newer revision of a data file contains modified segments. At step 320, a table of these differences is generated and maintained on the server. At step 330, query the product 20 to determine if the version of the product files are the newest files. If the answer to the query is "yes" then the method ends at step 340. If however, the answer to the query is "no", then the method continues to step 341 where the known new segments are delivered to the product files. At step 350, the file segments are activated, and the file transfer is completed at step 360.

Figure 4:
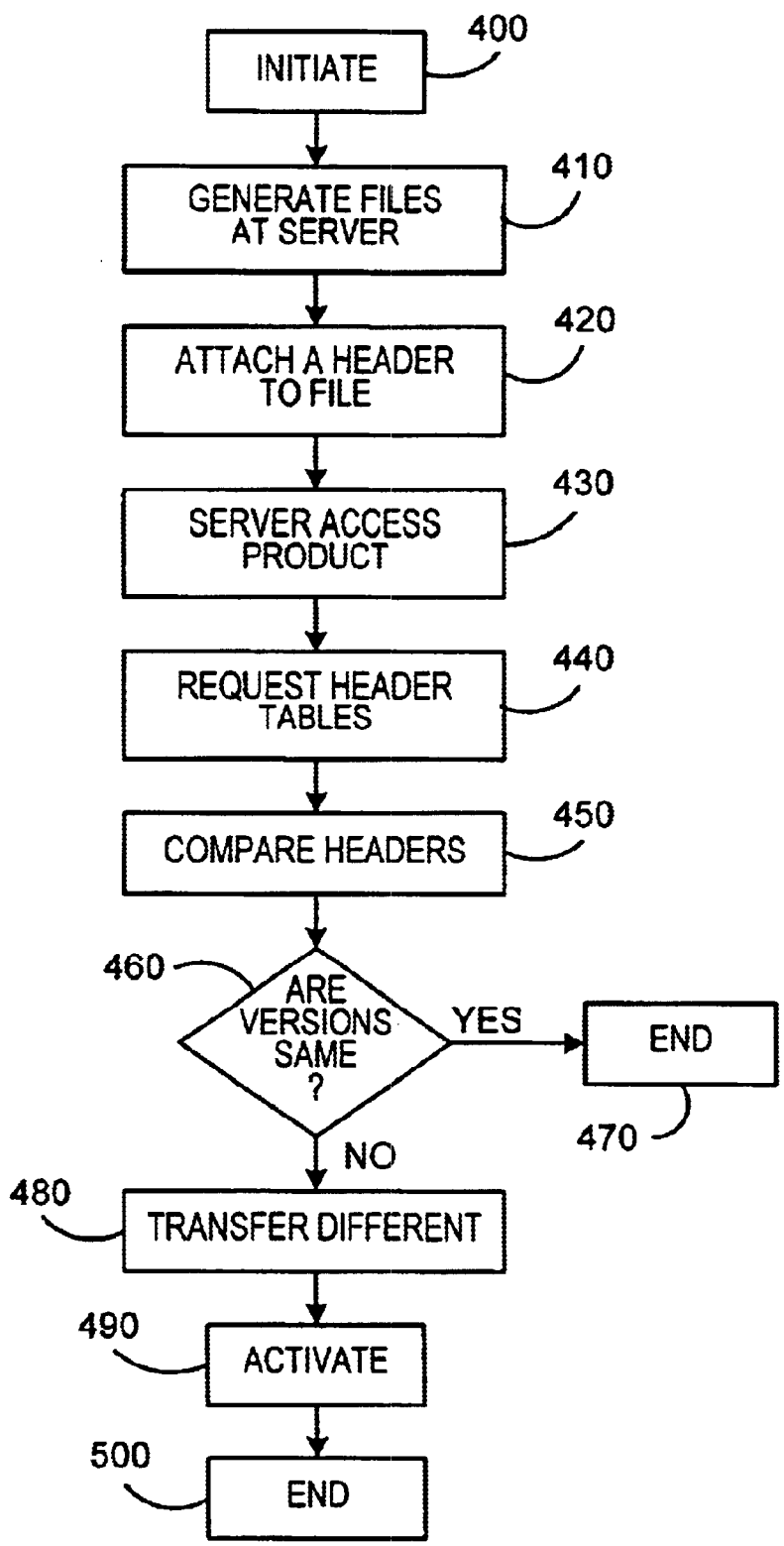
FIG. 4 is a flow chart of another embodiment of the preferred embodiment of the present invention.

Now turning to FIG. 4, there is shown the method flow of another embodiment of the present invention detailing the transfer of information using fragment tables. The method begins at step 400 where the system is initiated either by product 20 or server 70. At step 410, the new files are generated. In this embodiment, during the file generation process at step 420, a "header" is attached to the data file containing a directory of data segments along with their version number. At step 430, the server accesses the product. Progressing to step 440, the server database 70 requests the header tables and, therefore, determines the version of all data segments. The system is described in this embodiment as having the server initiate contact with the product in order to effect a file transfer. It is to be understood that the product may also initiate contact with the server to effect a file transfer. The product may contact the server based upon a predetermined time elapse period or continually poll the server to determine if any change is required.

Progressing to step 450, the method continues where the server processes the information and compares the file header stored in the server against the file headers stored in the product. At step 460, the method queries as to whether or not the product has the same or different file versions. If the answer to the query is "yes", then the method continues to step 470 where the file transfer is terminated. If, however, the answer to the query is "no", then the method continues to step 480 where the file segments designated as different or new are transferred to the product. The method progresses to step 490 where the files are activated. The file transfer ends at step 500.

Figure 5:
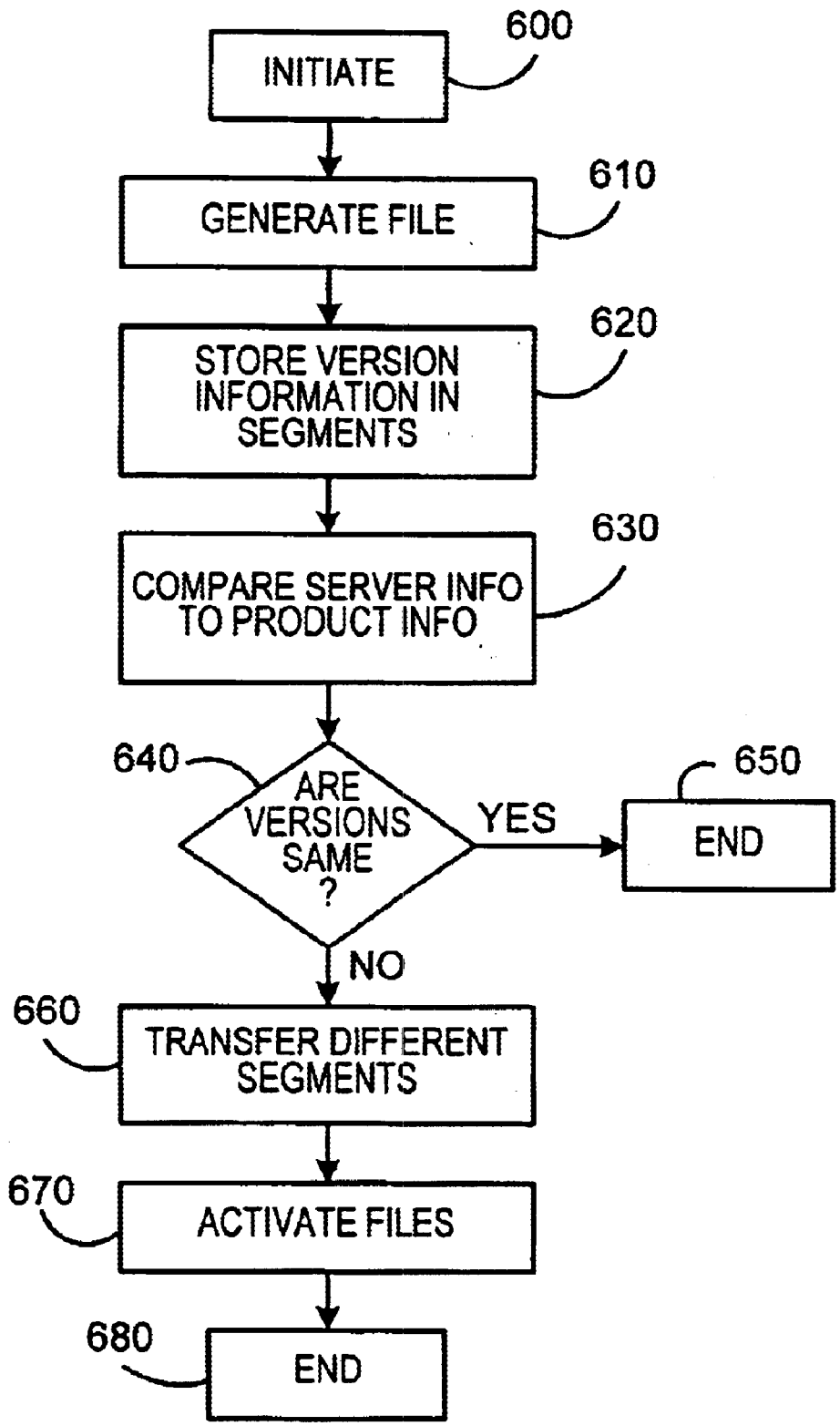
FIG. 5 is a flow chart of another embodiment of the preferred embodiment of the present invention.

Now turning to FIG. 5, there is shown a flow chart of another embodiment of the file transfer system of the present invention. The system is initiated at step 600 and progresses to step 610, where the file is generated. At step 620, during file generation, the version of the file is stored in the data segments. The data design may be expanded to include space to contain this data. The method progresses to step 630 where the information stored at the server is compared, via the network processing, to the information stored at the product. At step 640, the method is queried as to whether or not the versions are the same. If at step 640 it was determined that no different versions existed at this product than exist at the server, then the file transfer terminates. However, if at step 650, the versions at the server are determined to be different from the product, the method progresses to step 660 where the segments are gathered and transferred to the product, via network processing. Proceeding to step 670, the transferred files are activated, and the method ends at step 680.

Applicable to all of the above-described file transfer embodiments, several well-known file delivery technologies may be implemented to streamline data delivery. For example, after determining which data segments are needed, they could be ZIPPED, and this compressed data could be transmitted and unzipped on the product before it is re-integrated.

Several "difference engines" may also be used to stream line data transfer. This is a class of software that is different from compression technology such as ZIP. This software strips the difference between ZIP files into a "difference file". This "difference file" could be transmitted to the product where another processing engine re-integrates the differences into the original file to produce the new file. Difference processing done by "Difference Engine Software". This "Difference Engine" software can be applied to this update mechanism by determining the differences between segments—package the segment differences—and re-integrate them at the product.

The above specification describes a new and improved system and method for automatically transferring information in a data processing system. It is realized that the above description may indicate to those skilled in the art additional ways in which the principles of this invention may be used without departing from the spirit of the invention. Therefore, it is intended that this invention be limited only by the scope of the appended claims.

What is claimed is:

1. A method for updating files in a mailing system including the steps of:
   a) generating a first set of files at a first data processing system;
   b) parsing said first set of files into a first set of segments;
   c) parsing said first set of file segments into a first set of fragments;
   d) storing a second set of file fragments at a second data processing system;
   e) comparing said first set of file fragments to said second set of file fragments to determine which of said second set of file fragments are different from said first set of file fragments;
   f) packaging said different set of file fragments into a new file;
   g) transferring said new file to said second data processing center;
   h) disassembling said new file into new file fragments; and
   i) reassembling said new file fragments to form updated files.

2. The method claimed in claim 1 wherein said first data processing system is a server.

3. The method claimed in claim 1 wherein said second data processing system is a shipping/mailing system.

4. The method claimed in claim 1 wherein said first set of files is a postal rate information.

5. The method claimed in claim 1 wherein said first data processing system communicates with said second data processing system through an Internet connection.

6. The method claimed in claim 1 wherein said first data processing system communicates with said second data processing system through an Intranet connection.

7. A system for updating files in a mailing system comprising:
   a) a first data processing system for generating, storing a first set of files, parsing said first set of files into a first set of segments and parsing said first set of file segments into a first set of fragments;
   b) a second data processing system for storing a second set of fragmented files;
   c) means for comparing said first set of file fragments to said second set of file fragments to determine which of said second set of file fragments are different from said first set of file fragments;
   d) means for packing said different set of file fragments into a new file;

e) means for transferring said new file to said second data processing center;

f) means for disassembling said new file into new file fragments; and g) means for reassembling said new file fragments to form updated files.

* * * * *